United States Patent [19]

Sylvest

[11] 3,986,886

[45] Oct. 19, 1976

[54] MANUFACTURE OF CEMENT CLINKER FROM RAW SLURRY

[75] Inventor: Karl Jens Sylvest, Copenhagen Valby, Denmark

[73] Assignees: Aktieselskabet Niro Atomizer, Copenhagen, Denmark; F. L. Smidth & Co., Cresskill, N.J. ; part interest to each

[22] Filed: Dec. 28, 1973

[21] Appl. No.: 429,622

[30] Foreign Application Priority Data

Jan. 5, 1973 Denmark .............................. 50/73

[52] U.S. Cl. ................................................ 106/100
[51] Int. Cl.² .......................................... C04B 7/44
[58] Field of Search ................. 106/100; 432/14, 15

[56] References Cited
UNITED STATES PATENTS 3,703,275  11/1972  Sylvest ............................... 106/100

Primary Examiner—J. Poer
Attorney, Agent, or Firm—Pennie & Edmonds

[57] ABSTRACT

This invention relates to a method of manufacturing cement clinker from raw material in the form of cement raw slurry wherein the raw material is subjected to an initial heat treatment by bringing it into contact with hot gases by subjecting it to an initial spray drying in a spray dryer to convert the raw slurry into cement raw meal and preheated in a suspension preheater prior to burning it in a rotary kiln. Hot gases are directed from the rotary kiln to the preheater for preheating the spray dried raw meal while hot gases are directed to the spray dryer to provide heat for spray drying the raw slurry. A means for producing supplementary hot gases is provided with means for directing said supplementary hot gases in a manner to provide supplementary heat for heat treating the raw material prior to feeding it into the kiln. A rotary kiln plant for manufacturing cement clinker from raw material in the form of cement raw slurry according to the method of the invention is also disclosed.

19 Claims, 5 Drawing Figures

MANUFACTURE OF CEMENT CLINKER FROM RAW SLURRY

BACKGROUND OF THE INVENTION

1. Field of the Invention

This invention relates to improvements in the method of manufacturing cement clinker from cement raw slurry. The invention also relates to an improved plant for practicing the method of the present invention.

2. Description of the Prior Art

In the manufacture of cement clinker, which is an intermediate product in the manufacture of cement in a rotary kiln, a distinction is made between the wet method and the dry method carried through in a wet kiln and a dry kiln, respectively. In the former case the cement raw materials are fed to the rotary kiln in the form of an aqueous suspension, or a so-called raw slurry. In the latter case the cement raw materials are fed to the rotary kiln in their dry condition, usually in the form of a powder described as raw meal.

The method that is more advantageous in any given case generally depends upon circumstances. However, the tendency is towards preferring the dry method to the wet method, primarily due to the fact that the dry kiln has a heat economy superior to that of the wet kiln because a substantial amount of water has to be evaporated in the latter. Such evaporation of water requires a substantial quantity of fuel.

In certain cases the cement manufacturer may for some reason find it desirable to use a dry kiln for the manufacture of clinker, while using cement raw slurry as a starting material. This is best described as a combined method. In such a case the raw materials which may be used are perhaps in their natural state, so moist that it is more rational to increase the water content to such an extent that they may be best transported to the works as a slurry by being pumped through pipings rather than to have their water content reduced. In other cases the cement works may be located at such a large distance from the quarry where one or more of the raw materials are obtained, that the least costly way of transportation to the cement works will be to add water to the dry raw material and to pump the resulting slurry of raw material thus produced through pipings.

The aforesaid combined method of manufacturing cement clinker may advantageously be carried through by subjecting the raw slurry to a suspension drying, preferably a spray drying, since it will thereby be possible to reduce the temperature of the exit gases after drying to a larger extent than would be possible if the drying were preformed in the rotary kiln.

To operate as intended in combination with a conventional dry kiln working with the usual surplus of air, the spray dryer requires a supply of gas of a rather high temperature. The temperature required is generally in the range of approximately 900°–1200°C. On the other hand the spray dryer is also capable of withstanding these rather high temperatures which are actually within the normal temperature range of the exit gases from such a dry kiln. The spray dryer makes it possible in a single stage by means of hot gases to convert cement raw slurry having even a rather high water content, for instance 30–40% by weight, to practically water-free raw meal which is ready to be introduced into a rotary kiln.

The aforesaid combined method seems thus to offer substantial advantages which, however, are reduced to some extent by the fact that the raw meal is not preheated prior to being introduced into the rotary kiln. The raw meal produced by the spray drying has a temperature of about 100°C. and it would have been desirable if it were substantially higher. However, this drawback may be remedied by effecting a heat exchange between the rotary kiln gases and the raw meal in a suspension preheater before the said gases are used for spray drying of the raw slurry. This solution is in certain circumstances unsatisfactory; although the raw meal would, in fact, be preheated to, say, 600°–800°C., the corresponding temperature required of the rotary kiln gases would at the same time have to rise substantially, say, to about 1300°C. This would be unacceptable in view of the materials ordinarily used for the structures at the transition between the rotary kiln and the stationary smoke chamber.

I have invented a method and a plant for manufacturing cement clinker from raw materials in the form of cement raw slurry which overcome these disadvantages. An essential and surprising feature of the invention consists in carrying through the initial heat treatment of the raw slurry such that the hot exit gases from the rotary kiln are caused at first to give off heat for preheating at least part of the raw meal produced by the spray drying. Secondly, they contribute to carrying through the spray drying of the raw slurry; the remaining amount of heat necessary for the spray drying being procured from other sources, preferably from hot gases generated in a separate furnace. By thus supplying extra heat for the spray drying from a supplementary heat source, it is possible to achieve the improved desirable working conditions to which my invention is directed.

SUMMARY OF THE INVENTION

This invention relates to a method of manufacturing cement clinker from raw material in the form of cement raw slurry comprising subjecting the raw material to an initial heat treatment by bringing it into contact with hot gases by subjecting the raw material to an initial spray drying in at least one spray dryer to convert the raw slurry into a cement raw meal and preheating said spray dried raw meal in a suspension preheater prior to burning it to cement clinker in a rotary kiln. The method further comprises directing hot gases from the rotary kiln to said preheater for preheating said spray dried raw meal, and directing said hot gases to said spray dryer for spray drying said raw slurry. The method further comprises providing means for producing supplementary hot gases and directing said supplementary hot gases in a manner to provide supplementary heat for heat treating said raw material prior to feeding it into said kiln.

The invention also relates to a rotary kiln plant for manufacturing cement clinker from raw material in the form of cement raw slurry comprising: at least one spray dryer for converting cement raw slurry to cement raw meal; at least one suspension preheater for preheating the cement raw meal prior to burning it to cement clinker in a rotary kiln; means for directing hot exit gases from the rotary kiln to said preheater; supplementary heating means for producing supplementary heat by producing hot exit gases; means for directing the hot exit gases of said supplementary heating means in a manner to provide supplementary heat to at least one of said spray dryer and said suspension preheater for providing supplementary heat for at least one of spray drying said raw slurry and preheating said meal; means for transmitting heat contained in the exit gases of said suspension preheater to said spray dryer; means for directing the exit gases from the spray dryer away from the plant; means for introducing raw slurry into said spray dryer; means for feeding raw slurry converted into raw meal to said suspension preheater; and means for conveying preheated raw meal from the suspension preheater to the rotary kiln.

More particularly, the invention consists in adapting the amount of heat derived from the rotary kiln exit gases and the heat derived from other sources to one another such that the temperature of the gas used for spray drying the raw materials constitutes about 900°–1100°C., since temperatures within this range are in practice the preferred temperatures for spray drying these materials. It should be observed, however, that because it is possible in a supplementary furnace such as the type contemplated therein, to utilize a substantially larger excessive amount of air than in a rotary kiln, the contribution of the furnace gases to the spray drying may mean that the temperature of the kiln gases supplied need not be as high as the 900°–1100°C. indicated. This is due to the fact that the amount of gas has been increased. Thus, a kiln gas temperature as low as 350+C. has in certain cases been found sufficient when use is made of supplementary furnace gases as indicated. On the other hand, there may be cases in which a temperature of the gas used for spray drying as high as up to 1200°C. may be desirable. The transmission of the supplementary heat from the gases produced in the supplementary furnace to the spray dryer may be effected according to several embodiments of the invention.

Thus, according to one embodiment of the invention the gases deriving from the rotary kiln and the gases derived from other sources such as supplementary furnace gases, may advantageously meet where the spray drying is performed. Alternately, they may be united into one flow directly prior to the spray drying.

According to another embodiment of the invention the rotary kiln gases and the furnace gases are united in the furnace proper such that the rotary kiln gases are actually mixed in the furnace with the gases produced therein.

Finally, another embodiment of the invention relates to subjecting the flow of hot rotary kiln gases to indirect heating from outside by means of heat procured from other sources, preferably from a separate furnace. The said indirect heating is effected shortly before the flow of hot rotary kiln gases is to be used for spray drying.

As already stated, at least part of the raw meal produced by the spray drying is according to the invention preheated by means of the exit gases of the rotary kiln. Thus, a part of the raw meal may be preheated in another manner. For example, preheating the raw meal may be at least partially accomplished by the supplementary heating source which is primarily provided for spray drying of the raw slurry. In these circumstances, before giving off their heat contribution for the spray drying according to the invention, the gases from the furnace may be caused to give off heat for preheating part of the raw meal produced by the spray drying. That is, such part as is not preheated by the hot rotary kiln gases.

The reason why it may sometimes be convenient to utilize the supplementary furnace gases for preheating of raw meal before they contribute to the spray drying according to the embodiment set forth above is that the furnace gases are cooled somewhat in the preheating step before they supply heat to the spray dryer. Since the spray dryer often cannot withstand the temperatures produced by furnace gases, initially utilizing these gases to preheat the raw meal produced by the spray dryer is preferably to supplementing the furnace gases with cold gases. Such a procedure would naturally result in a heat loss. Thus, according to this modification of the invention, it is highly advantageous to utilize the surplus heat to preheat the raw meal.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Although the invention is particularly concerned with a rotary kiln plant for the purposes of the description, the Figures show but a very small portion of an inclined rotary kiln 1.

Figures 1, 2, 3:
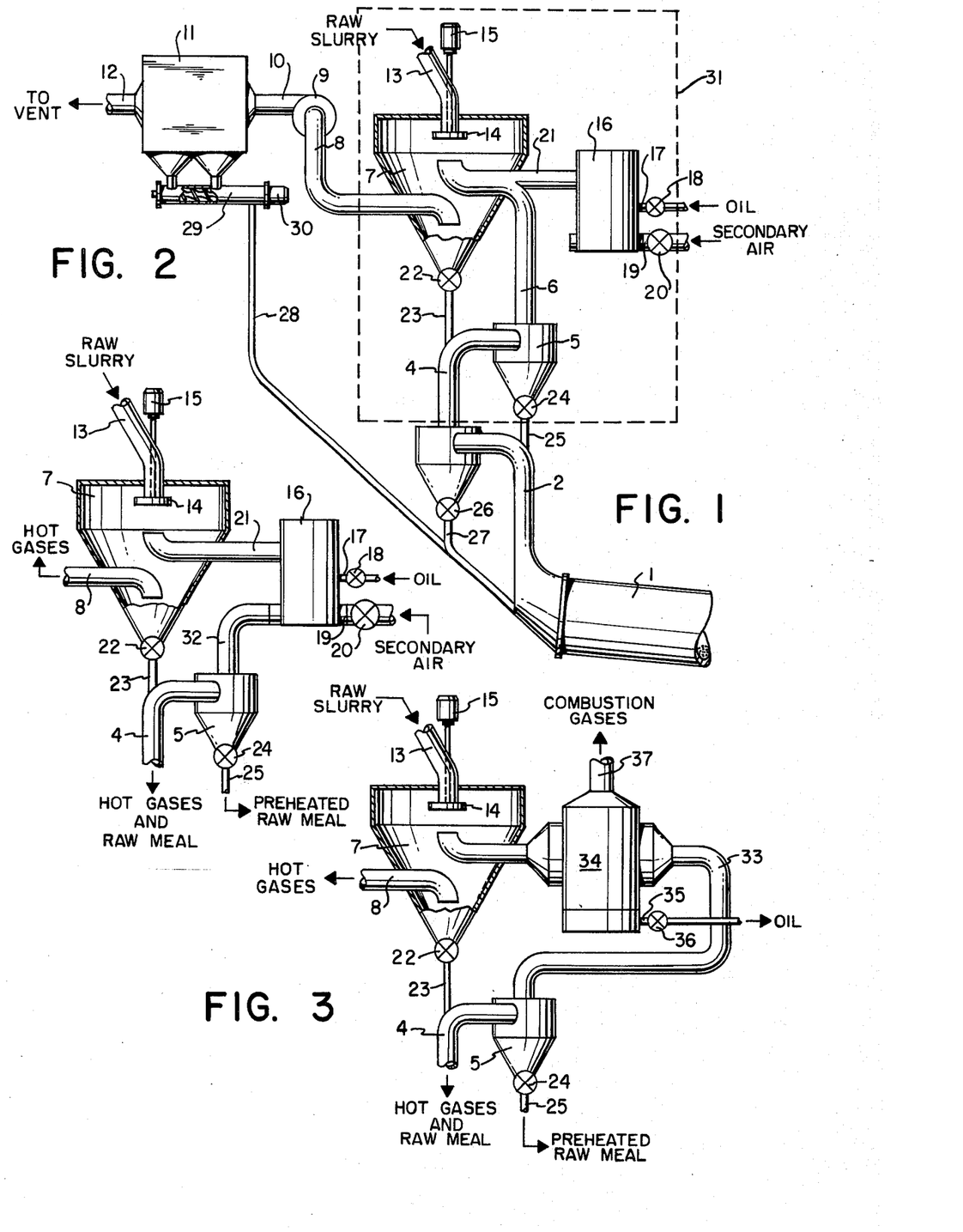
FIG. 1 illustrates a rotary kiln plant of the present invention.
FIG. 2 illustrates an alternate embodiment of the plant of FIG. 1 with a modification of the portions enclosed in phantom lines.
FIG. 3 illustrates another alternate embodiment of the plant of FIG. 1 with another modification of the portions enclosed in phantom lines.

Referring to FIG. 1 there is shown the upper end of rotary kiln 1. A smoke gas pipe 2 leading from the gas outlet end of the kiln 1, simultaneously comprises an integral part of a suspension preheater. As is shown in FIG. 1, pipe 2, connected to kiln 1, is the riser pipe of a so-called cyclone preheater. Apart from this, the said cylone preheater is comprised of a cyclone 3, a gas discharge pipe 4 leading from same to a second cyclone 5 of the cyclone preheater. A gas discharge pipe 6 leads from the said cyclone 5 to a spray dryer 7, in which the raw slurry is converted into raw meal. Having contributed to this conversion, the gases are discharged from the spray dryer 7 through a smoke gas pipe 8 leading to a fan 9. The said fan 9 produces the sub-atmospheric pressure necessary for causing the gases to flow along the path just described and having the reference numerals 1, 2, 3, 4, 5, 6, 7, 8, and 9.

The delivery side of the fan 9 is connected by a pipe 10 to a dust precipitator 11, referably an electrostatic dust precipitator, in which the dust contained in the smoke gases is precipitated. The cleaned gases leave the dust precipitator 11 through a pipe 12, leading to a vent (not shown).

Raw slurry is fed to the spray dryer 7 through a pipe 13. Inside the spray dryer the pipe 13 opens into an atomizer wheel 14 by which the slurry is hurled out as fine drops. The atomizer wheel is rotated by a motor 15. As can be seen in FIG. 1, smoke gases are provided from the gas outlet end of the kiln to the spray dryer.

In addition to the smoke gases derived from the rotary kiln 1, gases are also supplied to the spray dryer 7 from a supplementary source. A preferred supplementary source of gases is a supplementary furnace as is shown at 16. The said furnace 16 is preferably of the type which is provided with an oil burner (not shown) and which is fed with oil through a pipe 17 having a regulating valve 18. Secondary air may be supplied to the furnace 16 for combustion, and a valve 20 comprises a means by which the amount of secondary air may be regulated. Further, a pipe 21 passes the hot gases from the furnace 16 to the spray dryer 7. The pipe 21 and the pipe 6 previously referred to are united into a single prior to being introduced into the spray dryer 7.

Before the hot gases supplied through the pipes 6 and 21 are carried away through the pipe 8, they effect the drying of the slurry particles hurled out inside the spray dryer 7 by the atomizer wheel 14. The dry raw meal settles in the bottom of a spray dryer 7 where there is provided a rotary gate valve 22 which permits the passage of the raw meal down into a pipe 23 located beneath the rotary gate valve 22, but prevents gas from entering up through the said pipe into the spray dryer 7.

The lower end of the pipe 23 opens inside the riser pipe 4 which connects the cyclones 3 and 5. The raw meal will therefore be entrained by the gases passed vertically up through the said pipe 4 by which there will be an intensive exchange of heat between the gases and the raw meal with the result that the gases will be cooled and the raw meal will be preheated and subsequently separated from the gases again in the cyclone 5. The gases leave the said cyclone 5 through the pipe 6 as previously referred to. The preheated raw meal, however, settles in the bottom of the cyclone 5, leaving same through a rotary gate valve 24 of similar kind and of identical function as the rotary gate valve 22 previously referred to. Beneath the rotary gate valve 24 is provided a vertical pipe 25 from the lower end of which the preheated raw meal is fed into the riser pipe 2. From here it is introduced by the gases into the cyclone 3, that is, the operation just described in relation to the riser pipe 4 and the cyclone 5 is repeated. In other words, the raw meal is subjected to further preheating and the hot gases ascending from the rotary kiln 1 through the riser pipe 2 are correspondingly cooled. From the cyclone 3, the smoke gases pass up through the riser pipe 4 as previously described, whereas the preheated raw meal settles in the bottom of the cyclone 3, leaving same through a rotary gate valve 26 corresponding to the gate valves 22 and 24. Beneath the rotary gate valve 26 is a vertical pipe 27 through which the preheated raw meal is fed into an inclining pipe 28 which introduces the preheated raw meal into the rotary kiln 1 where it is burnt to cement clinker.

The dust precipitated by the dust precipitator 11 sinks to the bottom of same and is passed by means of a worm conveyor 29 driven by a motor 30 down into the pipe 28 previously referred to. Therefore, in addition to the preheated raw meal from the cyclone preheater, the dust from the dust precipitator 11 will also be introduced into the rotary kiln 1.

The cyclone preheater shown in FIG. 1 comprises two cyclones, denoted 3 and 5 and is therefore generally described as a two-stage cyclone preheater. Dependent upon circumstances it might have been more appropriate to use a one-stage, a three-stage or a four-stage preheater.

The spray dryer 7, the furnace 16 and a part of the cyclone preheater (that is, pipes 4, 6 and cyclone 5) are, together with the pipes connecting these parts with one another, surrounded by phantom lines referred to as 31 in FIG. 1. The portion of the plant which is inside the said phantom lines may be substituted either by the corresponding portions shown in FIG. 2 or the corresponding portions shown in FIG. 3, by which modifications of the plant shown in FIG. 1 are produced. These modifications represent alternate embodiments of the present invention.

In FIG. 2 and consecutive Figures, parts corresponding to those illustrated in FIG. 1 are identified by the same reference numerals as in FIG. 1 except where specifically noted. Therefore, specific reference to each and every component in these Figures is considered unnecessary. Thus, referring to FIG. 2, the reference numeral 5 denotes the uppermost one of the cyclones belonging to the cyclone preheater. Also, the spray dryer 7 and the supplementary furnace 16 will also be recognized. However, the pipe arrangement between these components differs from that according to FIG. 1.

As previously noted, the purpose of the furnace is to supplement the heat transmission to the spray dryer 7. As can be seen by referring to FIG. 2 this can be effected by passing the smoke gas flow from kiln 1 and the cyclone preheater into the furnace 16 through a pipe 32 so that the said gas may be mixed in the furnace 16 with the gas produced in same. The gas of furnace 16 is produced by the combustion of the oil, nourished by the atmospheric secondary air introduced through the pipe 19. According to this embodiment the amount of smoke gas conveyed from the furnace 16 through the pipe 21 is substantially increased, just as the gas temperature will be substantially higher than would be possible for the furnace 16 to effect when connected as shown in FIG. 1.

Referring now to FIG. 3 there is illustrated a third modification of the invention. In this case as according to FIG. 2, the smoke gases are passed from kiln 1 and cyclone preheater 5. However, in this embodiment the gases are passed through a connecting pipe denoted 33, and through a furnace 34. It should be noted that the furnace has a different reference numeral, that is, 34 instead of 16 (as in FIGS. 1 and 2), because it is of another type. It must be assumed that the smoke gas flow from the pipe 33 inside the furnace 34 distributes itself over a number of parallel horizontal pipes (not shown) which at the discharge side of the furnace again unite into one pipe denoted 38. Pipe 38 in FIG. 3 corresponds to the pipe 21 according to FIG. 1 and FIG. 2 and thus leads into the spray dryer 7. The said parallel string of pipes is swept by hot smoke gases produced by the combustion of oil at the bottom of the furnace 34. The pipe for feeding this oil is denoted 35 and is provided with a regulating valve 36. The combustion gases escape through a gas outlet pipe 37 mounted at top of the furnace 34 after they have (by indirect heat transmission) caused the temperature of the smoke gases flowing through the pipe 33 to rise to a level sufficiently high to ensure satisfactory operation of the spray dryer 7.

Figures 4, 5:
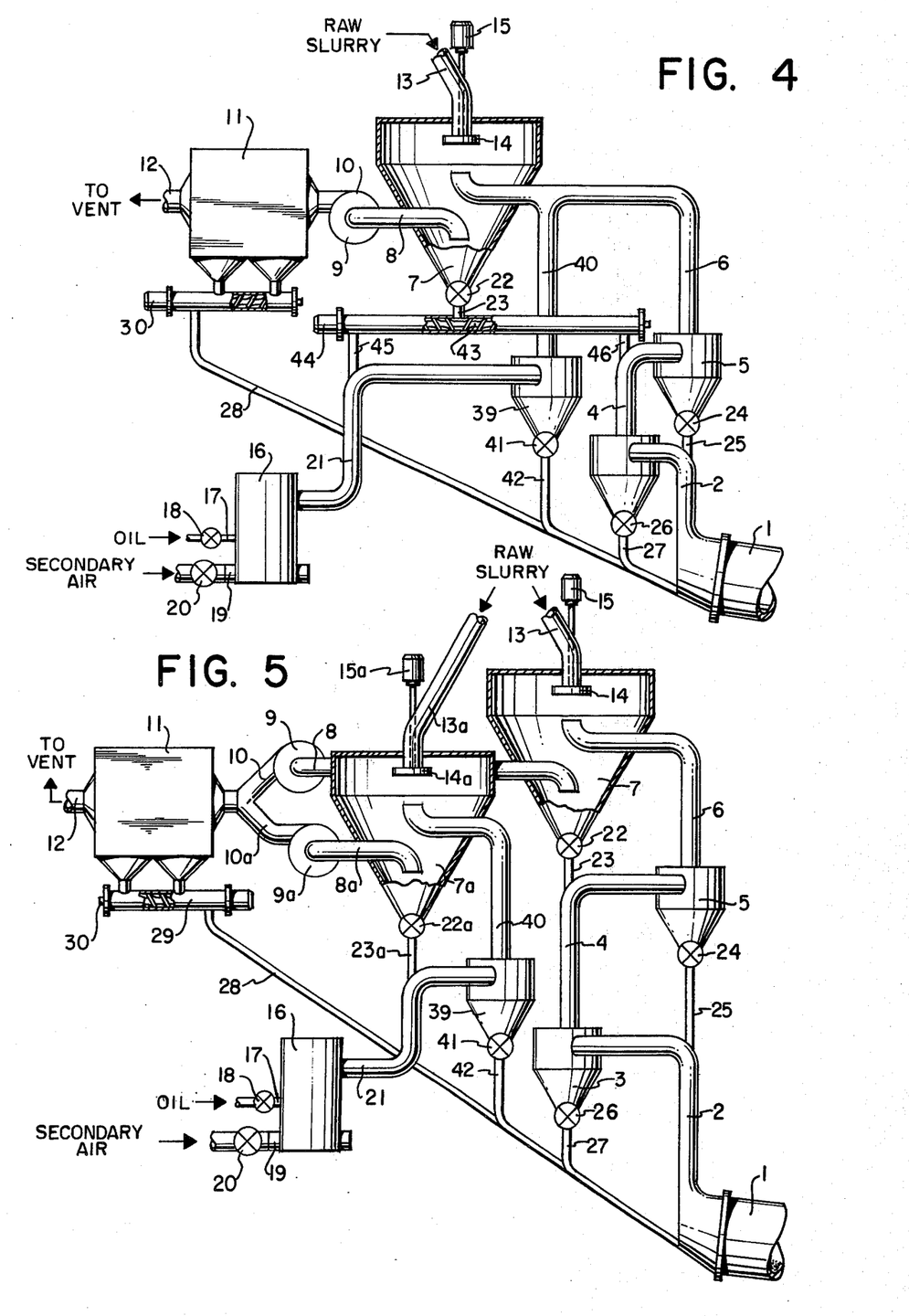
FIG. 4 shows still another alternate embodiment of the plant of the invention utilizing two suspension preheaters working in parallel.
FIG. 5 shows still another alternate embodiment of the plant of the invention but provided with two suspension preheaters working in parallel and two spray dryers likewise working in parallel.

Although the plant shown in FIG. 4, insofar as its mode of operation is concerned, differs somewhat from that shown in FIGS. 1, 2, and 3, it consists substantially of the same components as those shown in the said previous FIGS., and the reference numerals are therefore essentially the same as in the said Figures except as specifically noted.

In the plant illustrated in FIG. 4, between the kiln 1 and the spray dryer 7 there is inserted a two-stage cyclone preheater with the main components 2, 3, 4, 5, 6, similarly as in the plant shown in FIG. 3. The plant according to FIG. 4 has the pipe 21 connected as a riser pipe from a supplementary furnace 16 to an additional one-stage cyclone preheated consisting of a cyclone 39. In FIG. 1, the corresponding pipe 21 connects the furnace 16 directly with the spray dryer 7. The cyclone preheater 39 further has a gas outlet pipe 40 which opens into the pipe 6 directly before being connected with the spray dryer 7. A downpipe 42 extends below cyclone 39 for directing the raw meal precipitated in the cylone. A gate valve 41 permits the passage of the raw meal down into downpipe 42.

Thus, use is made here of two cyclone preheaters, working in parallel, one through which there is a flow of rotary kiln gases and another through which the gases from the furnace flow. As will be appreciated the two flows of gases are united directly before the spray dryer 7. In this case the flow of gases from the furnace 16 is thus not introduced directly into the spray dryer 7, but is at first passed through a one-stage cyclone preheater. Owing to the presence of the said cyclone preheater the spray dryer is not subjected to gas temperature that is too high since there is a heat loss in the said cyclone preheater. The heat lost is, however, utilized for preheating the raw meal.

Since there are two cyclone preheaters in the embodiment of FIG. 4, the raw meal produced in the spray dryer has to be distributed to both of them. This is effected by means of a worm conveyor 43 driven by a motor 44. The said worn conveyor communicates approximately midway with the spray dryer through the pipe 23. At the given direction of rotation of the worm its direction of conveyance is on the right-hand side of the pipe 23 to the right and on the lefthand side of the pipe to the left as shown in the drawing. The flow of raw meal from the pipe 23 is thus divided into two flows, each conveyed in its separate direction. The flow to the left leaves the worm conveyor 43 through a downpipe 45 which opens below inside the riser pipe 21. The flow to the right leaves the worm conveyor 43 through a downpipe 46 which opens below inside the riser pipe 4.

According to FIG. 4 there is only one fan 9 for producing the suction that conveys the smoke gases from the rotary kiln and the smoke gases from the furnace, respectively, through the spray dryer. As a result, it is difficult to regulate the two flows of smoke gas in relation to each other with a view to ensuring a proper volume of gas flow of the proper temperature through the spray dryer 7. This has been remedied in the plant shown in FIG. 5, which is provided with two fans 9 and 9a the speed (or possible regulating dampers, not shown) of which may be regulated independently of each other. Two spray dryers 7 and 7a are provided. The reference numerals for the individual parts of one of these spray dryers are also provided with an index a. Similarly, suction pipe and delivery pipe of fan 9a have reference numerals with index a and substantially correspond to parts of spray dryer 7 previously described.

The spray dryer 7 is supplied with smoke gases from the rotary kiln 1 through the riser pipe 2, and the cyclone preheater 3, 4, 5 and the pipe 6 as shown. The spray dryer 7a is supplied with smoke gas from the furnace 16 through the cyclone preheater consisting of the riser pipe 21, the cyclone 39 and the gas outlet pipe 40 as shown. Both the spray dryer 7 and the spray dryer 7a produced raw meal which is discharged at the bottom of the spray dryers through the pipes 23 and 23a, respectively. The former opens inside the riser pipe 4, and the latter opens inside the riser pipe 21 as shown.

It is the use of two spray dryers 7 and 7a that makes it possible to regulate the flows of gases from the rotary kiln 1 and the furnace 16, respectively, independently of each other. In plants for large productions it may further be advantageous to distribute the drying of the raw slurry on two spray dryers and the preheating of the raw meal on two cyclone preheaters. A one-stage cyclone preheater will usually be sufficient before the spray dryer 7a in which drying takes place by means of furnace gas as indicated.

I claim:

1. A method of manufacturing cement clinker from raw material in the form of cement raw slurry comprising:
   a. directing the raw slurry to at least one spray dryer;
   b. dispensing the raw slurry into said spray dryer and directing hot gases thereto in a manner to convert the raw slurry into cement raw meal;
   c. directing said spray dried raw material to a suspension preheating means;
   d. preheating said spray dried raw material in said suspension preheating means prior to burning it in a kiln;
   e. directing hot exit gases from the kiln to the preheating means for preheating said spray dried raw material;
   f. directing said hot kiln exit gases from said preheating means ultimately to said spray dryer to provide at least a portion of the heat necessary to convert the raw slurry to cement raw meal in said spray dryer;
   g. producing supplementary hot gases in a supplementary heating means independent of the kiln;
   h. directing said supplementary hot gases in such a manner as to provide supplementary heat for the hot kiln exit gases utilized to heat treat the spray dried raw material;
   i. feeding the preheated raw meal to said kiln; and
   j. burning said preheated raw meal to form cement clinker.

2. The method of manufacturing cement clinker from cement raw slurry according to claim 1 further comprising producing said supplementary hot gases in a separate furnace, and directing said hot gases thus produced to at least one of said preheating means and spray dryer in a manner to provide supplementary heat for the initial heat treatment of said raw material prior to feeding it into said kiln.

3. The method of manufacturing cement clinker from cement raw slurry according to claim 2 further comprising producing said supplementary hot gases in said separate furnace at such temperature that the combined heat from said rotary kiln exit gases and the heat derived from said separate furnace produces a temperature of the gases used for spray drying of said raw material in the range of approximately 900° to 1100° C.

4. The method of manufacturing cement clinker from cement raw slurry according to claim 3 further comprising uniting the hot gases derived from said rotary kiln and the hot gases derived from said separate furnace at the spray dryer approximately at the location where the hot spray drying takes place.

5. The method of manufacturing cement clinker from cement raw slurry according to claim 3 further comprising uniting the hot gases derived from said rotary kiln and the hot gases derived from said separate furnace prior to directing them into said spray dryer.

6. The method according to claim 5 further comprising uniting said hot gases from said rotary kiln and the hot gases produced by said separate furnace at said furnace proper.

7. The method according to claim 5 further comprising uniting said hot gases from said rotary kiln and said hot gases produced by said separate furnace at said furnace proper.

8. The method of manufacturing cement clinker from cement raw slurry according to claim 2 further comprising subjecting said hot exit gases from said rotary kiln to indirect heating in said separate furnace by dividing said rotary kiln gases into separate streams, directing said gas streams into substantially parallel horizontal branch pipes positioned within said separate furnace, directing said supplementary gases produced in said separate furnace past said parallel pipes, and reuniting said heating kiln exit gases prior to directing said kiln exit gases to said spray dryer.

9. The method of manufacturing cement clinker from cement raw slurry according to claim 1 further comprising subjecting said hot exit gases from said rotary kiln to indirect heating in said separate furnace by dividing said rotary kiln gases into separate streams by directing said gases into substantially parallel horizontal branch pipes positioned within said separate furnace and directing said supplementary gases produced in said separate furnace past said parallel pipes and reuniting said heated kiln exit gases prior to directing said kiln exit gases to said spray dryer.

10. The method of manufacturing cement clinker from cement raw slurry according to claim 1 further comprising producing said supplementary hot gases by introducing oil and supplementary air into said supplementary heating means and burning the oil therein, and directing said gases produced by said supplementary heating means to said preheating means to preheat at least a portion of the raw meal produced by said spray dryer prior to utilizing said supplementary gases for spray drying of said raw slurry.

11. The method of manufacturing cement clinker from cement raw slurry according to claim 2 further comprising producing said supplementary hot gases by introducing oil and supplementary air into said separate furnace and burning the oil therein, and directing said gases produced by said separate furnace to said preheating means to preheat at least a portion of the raw meal produced by said spray dryer prior to utilizing said supplementary gases for spray drying of said raw slurry.

12. The method of manufacturing cement clinker from cement raw slurry according to claim 3 further comprising producing said supplementary hot gases by introducing oil and supplementary air into said separate furnace and burning the oil therein, and directing said gases produced by said separate furnace to said preheating means to preheat at least a portion of the raw meal produced by said spray dryer prior to utilizing said supplementary gases for spray drying of said raw slurry.

13. The method of manufacturing cement clinker from cement raw slurry according to claim 4 further comprising producing said supplementary hot gases by introducing oil and supplementary air into said separate furnace and burning the oil therein, and directing said gases produced by said separate furnace to said preheating means to preheat at least a portion of the raw meal produced by said spray dryer by utilizing said supplementary gases for spray drying of said raw slurry.

14. The method of manufacturing cement clinker from cement raw slurry according to claim 2 further comprising:
k. directing the hot kiln gases from said preheating means to said separate furnace;
l. mixing said hot kiln gases with said supplementary hot gases produced in said separate furnace; and
m. directing the combined hot kiln gases and supplementary hot gases to said spray dryer to provide at least a portion of the heat necessary to convert the raw slurry to cement meal in said spray dryer.

15. The method of manufacturing cement clinker from cement raw slurry according to claim 1 further comprising:
k. directing the hot kiln gases from said preheating means to a supplementary heating means in the form of a separate furnace;
l. dividing the hot kiln gases into separate streams within said separate furnace;
m. producing said supplementary hot gases in said supplementary separate furnace;
n. directing said supplementary hot gases past said separate streams of hot kiln gases in a manner to indirectly transfer heat to the said hot kiln gases;
o. reuniting the heated hot kiln gases; and
p. directing said heated hot kiln gases to said spray dryer to provide at least a portion of the heat necessary to convert the raw slurry to cement raw meal in said spray dryer.

16. The method of manufacturing cement clinker from cement raw slurry according to claim 15 further comprising producing said supplementary hot gases in said separate furnace at such temperatures that the combined heat from said rotary kiln exit gases and the heat derived from said separate furnace produces a temperature of the gases used for spray drying of said raw material in the range of approximately 900° to 1100° C.

17. A method of manufacturing clinker from raw material in the form of cement raw slurry comprising:
a. directing the raw slurry to at least one spray dryer;
b. directing the raw slurry into said spray dryer and hurling said raw slurry therein by an atomizer wheel while directing hot gases thereto to convert the raw slurry into cement raw meal.
c. directing the spray dried raw material from the spray dryer to a cyclone suspension preheater;
d. preheating said spray dried raw material in said preheater prior to burning it in a rotary kiln;
e. producing supplementary hot gases in a separate furnace independent of said kiln;
f. directing said supplementary hot gases produced in said separate furnace to the hot gas outlet portion of said preheater in a manner to combine the supplementary gases and preheater outlet gases within the spray dryer to provide the heat necessary to convert the raw slurry to cement raw meal;
g. feeding the preheated raw meal from said preheater to said rotary kiln; and h. burning said raw meal to form cement clinker.

18. A method of manufacturing cement clinker from raw material in the form of cement raw slurry comprising:
   a. directing raw slurry to a spray dryer;
   b. directing the raw slurry into said spray dryer and hurling said raw slurry into said spray dryer and hurling said raw slurry therein by an atomizer wheel while directing hot gases thereto to convert the raw slurry into cement raw meal;
   c. directing the spray dried raw material from the spray dryer to a multistage cyclone suspension preheater;
   d. preheating said spray dried raw material in said preheater prior to burning it in a rotary kiln;
   e. producing supplementary hot gases in a separate furnace independent of said rotary kiln by continuously feeding secondary air and oil into said separate furnace and burning the oil therein;
   f. directing the supplementary hot gases produced in said separate furnace to at least one cyclone stage of said preheater to join the supplementary hot gases with the hot gases passing from said rotary kiln through said preheater;
   g. directing the combined hot gases from said separate furnace and said preheater to said spray dryer to provide the heat necessary to convert the raw slurry into cement raw meal; and
   h. directing the preheated raw meal from said cyclone suspension preheater to said rotary kiln and burning it to form cement clinker.

19. A method of manufacturing cement clinker from raw material in the form of cement raw slurry comprising;
   a. dividing the raw slurry into at least two streams;
   b. feeding one stream of raw slurry into a first spray dryer and directing hot gases to said first spray dryer to convert the raw slurry into cement raw meal;
   c. withdrawing the spent hot gases from said first spray dryer;
   d. feeding the second stream of raw slurry to a second spray dryer;
   e. withdrawing the spent hot gases from said second spray dryer;
   f. directing the raw meal produced in said spray dryers to associate portions of a cyclone suspension preheater for preheating the raw meal prior to burning it in a rotary kiln;
   g. directing hot exit gasses from said rotary kiln to the cyclone suspension preheater portion associated with the said first spray dryer to preheat the raw meal;
   h. producing supplementary hot gases in a separate furnace by burning oil in the presence of secondary air;
   i. directing the supplementary hot gases from the separate furnace to the cyclone suspension preheater portion associated with said second spray dryer to preheat the raw meal;
   j. directing the supplementary hot gases from the cyclone suspension preheater portion associated with said second spray dryer to said second spray dryer to provide the heat necessary to convert the raw slurry into cement raw meal in said second spray dryer;
   k. directing the kiln exit gas from the cyclone preheater portion associated with the said first spray dryer to said first spray dryer to provide the heat necessary to convert the raw slurry into cement raw meal;
   l. regulating the flow of hot gases from the rotary kiln and said separate furnace independently of each other so as to distribute in predetermined portions, the drying of the raw slurry in the spray dryers and the preheating of the raw meal in said associatd cyclone preheater sections;
   m. combining the preheated raw meal from said separate preheater portions;
   n. directing the combined preheated raw meal from said separate preheater portions to said rotary kiln; and
   o. burning said raw meal to form cement clinker.

* * * * *

UNITED STATES PATENT AND TRADEMARK OFFICE
CERTIFICATE OF CORRECTION

PATENT NO. : 3,986,886
DATED : October 19, 1976
INVENTOR(S) : Karl Jens Sylvest

It is certified that error appears in the above-identified patent and that said Letters Patent are hereby corrected as shown below:

Column 3, line 26, "350+C" should read -- 350°C --

Column 4, line 60, "referably" should read -- preferably --

Column 5, line 16, after "single" and before "prior", insert -- pipe --

Column 7, line 37, "worn" should be -- worm --

Column 8, line 61, "temperature" should read -- temperatures --

Column 10, line 4, "saiid" should read -- said --

Column 10, line 8, after "dryer" and before "to", insert -- prior --

Claim 18 b., Column 11, lines 7-8, after "raw slurry", first occurrence, and before "therein", delete -- into said spray dryer and hurling said raw slurry --

Claim 19 f., Column 12, line 6, "associate" should read -- associated --

Claim 19 g., Column 12, line 9, "gasses" should read -- gases --

UNITED STATES PATENT AND TRADEMARK OFFICE
CERTIFICATE OF CORRECTION

PATENT NO. : 3,986,886

DATED : October 19, 1976

INVENTOR(S) : Karl Jens Sylvest

It is certified that error appears in the above-identified patent and that said Letters Patent are hereby corrected as shown below:

Claim 19 l., Column 12, line 35, "associatd" should read -- associated --

Signed and Sealed this

Twenty-fourth Day of January 1978

[SEAL]

Attest:

RUTH C. MASON
Attesting Officer

LUTRELLE F. PARKER
Acting Commissioner of Patents and Trademarks